(12) United States Patent
Maitay et al.

(10) Patent No.: US 12,736,091 B2
(45) Date of Patent: Sep. 15, 2026

(54) STEERING BELLOWS

(71) Applicant: TRELLEBORG CARQUEFOU, Carquefou (FR)

(72) Inventors: Frederic Maitay, Riaille (FR); Lionel Bourbigot, Vertou (FR); Jeremy Poullaouec, Nantes (FR)

(73) Assignee: TRELLEBORG CARQUEFOU, Carquefou (FR)

( * ) Notice: Subject to any disclaimer, the term of this patent is extended or adjusted under 35 U.S.C. 154(b) by 0 days.

(21) Appl. No.: 18/705,815

(22) PCT Filed: Oct. 27, 2022

(86) PCT No.: PCT/FR2022/052047
§ 371 (c)(1),
(2) Date: Apr. 29, 2024

(87) PCT Pub. No.: WO2023/073326
PCT Pub. Date: May 4, 2023

(65) Prior Publication Data

US 2026/0139712 A1 May 21, 2026

(30) Foreign Application Priority Data

Oct. 28, 2021 (FR) ....................................... 2111448

(51) Int. Cl.
*F16D 3/84* (2006.01)
*B62D 3/12* (2006.01)
(Continued)

(52) U.S. Cl.
CPC ............... *F16D 3/845* (2013.01); *B62D 3/12* (2013.01); *F16J 3/042* (2013.01); *B29L 2031/703* (2013.01); *F16D 2300/18* (2013.01)

(58) Field of Classification Search
CPC . F16D 3/845; F16D 3/843; F16D 3/84; F16D 2300/18; B62D 3/12; B62D 5/0481;
(Continued)

(56) References Cited

U.S. PATENT DOCUMENTS 11,137,314 B2 * 10/2021 Collier .................. G01M 3/045
11,435,253 B2 * 9/2022 Wutzler ............... B62D 5/0403
(Continued)

FOREIGN PATENT DOCUMENTS

DE 102005040124 A1 * 3/2007 ............... B62D 3/12
DE 102007015329 A1 * 10/2008 ............... B62D 3/00
(Continued)

OTHER PUBLICATIONS

International Search Report dated Jan. 12, 2023.

*Primary Examiner* — Keith J Frisby
(74) *Attorney, Agent, or Firm* — IPSILON USA, LLP

(57) ABSTRACT

A steering bellows (1) has a sleeve (2) delimited by a peripheral lateral wall (3). The sleeve (2) has, in succession in the axial direction, at least one first annular end, referred to as the large base (4), a part (5) which can be deformed in the direction of an elongation or shortening of said bellows (1) and which is formed of a succession of coaxial turns, and a second annular end referred to as the small base (6). The sleeve (2) has a zone (7) of transition between the deformable part (5) and the large base (4) and having, in the transition zone (7), a radial outlet (8) provided in the peripheral lateral wall (3) of the sleeve (2). The radial outlet (8) is closed by a tubular endpiece (9) that is mounted on the radial outlet (8) and that has a first end (10) connected to the radial outlet (8) and an opposite closed end (11). This endpiece (9) extends outside the sleeve (2), this endpiece (9) internally delimiting a cavity (10) housing at least one fluid-tightness sensor (13) of the bellows.

12 Claims, 8 Drawing Sheets

(51) Int. Cl.
*F16J 3/04* (2006.01)
*B29L 31/00* (2006.01)

(58) Field of Classification Search
CPC . B62D 5/0484; F16J 3/042; F16J 3/041; F16J 3/04; B29L 2031/703
USPC ........................ 280/93.514, 93.515; 701/34.4
See application file for complete search history.

(56) References Cited

U.S. PATENT DOCUMENTS 11,492,037 B2 * 11/2022 Sasaki ..................... F16H 57/00
2008/0193207 A1 * 8/2008 Kruse ................. F16C 11/0647 700/13
2010/0049403 A1 * 2/2010 Gillman ............... H05K 1/0268 180/443
2013/0138299 A1 * 5/2013 Bhae ........................ B62D 6/00 701/42
2016/0001815 A1 * 1/2016 Sasaki .................. B62D 5/0487 701/41
2016/0075372 A1 * 3/2016 Cicero ................. B62D 5/0496 701/34.4
2017/0050669 A1 * 2/2017 Asakura ............... B62D 5/0448
2017/0248505 A1 * 8/2017 Holmes ............... F16C 11/0647
2017/0274929 A1 * 9/2017 Sasaki ...................... B62D 5/04
2017/0341681 A1 * 11/2017 Shiino .................... B62D 5/046
2018/0022379 A1 * 1/2018 Sasaki .................. B62D 5/0481 701/41
2018/0178829 A1 * 6/2018 Fujimoto ............. H02K 11/215
2018/0194390 A1 * 7/2018 Goto ...................... B62D 5/046
2019/0047611 A1 * 2/2019 Murakami ............. H02K 11/33
2019/0170251 A1 * 6/2019 Larson ..................... B62D 3/12
2019/0176872 A1 * 6/2019 Sato ..................... B62D 5/0481
2019/0250063 A1 * 8/2019 Haubenstricker .... B62D 5/0406
2021/0245802 A1 * 8/2021 Larson ................ G01M 3/3272
2022/0402543 A1 * 12/2022 Haubenstricker ....... G01M 3/26
2023/0001982 A1 * 1/2023 Son ...................... B62D 5/0406
2023/0034783 A1 * 2/2023 Span ...................... B62D 3/126
2023/0243714 A1 * 8/2023 Fendler .................... F16J 3/041 73/46

FOREIGN PATENT DOCUMENTS

DE 102012019427 A1 * 4/2014 ............... B62D 3/12
DE 102016123900 B4 * 6/2018
DE 102017207094 A1 * 10/2018 ........... B62D 5/0406
DE 102017211278 A1 * 1/2019 ........... B62D 5/0424
DE 102019114337 A1 * 12/2020 ........... B62D 5/0481
EP 1213514 A2 * 6/2002 ............. F16D 3/845
EP 3495237 A1 * 6/2019 ........... B62D 5/0424
FR 2910949 A1 * 7/2008 ............... F16J 3/046
FR 2926619 A1 * 7/2009 ............... F16J 3/046
JP 2006111032 A * 4/2006
JP 2009023402 A * 2/2009
JP 2009067117 A * 4/2009
JP 2011088587 A * 5/2011
JP 2012224274 11/2012
JP 2012224274 A * 11/2012
JP 2012240435 12/2012
JP 2012240435 A * 12/2012
JP 2014131908 A * 7/2014
JP 2014234102 A * 12/2014
JP 2017114292 A * 6/2017
JP 2018080946 A * 5/2018
KR 100558301 B1 * 3/2006 ............. H10N 30/00
KR 20130128622 11/2013
KR 20130128622 A * 11/2013 ............... B62D 7/20
WO WO-2016111866 A1 * 7/2016 ........... B62D 5/0481
WO WO-2018110216 A1 * 6/2018 ............... F16H 7/02

* cited by examiner 18
10
8
13
11
15
14
16
17
9
3
1
2

STEERING BELLOWS

RELATED APPLICATION

This application is a National Phase of PCT/FR2022/052047 filed on Oct. 27, 2022, which claims the benefit of priority from French Patent Application No. 21 11448 filed on Oct. 28, 2021, the entirety of which are incorporated by reference.

FIELD OF THE INVENTION

The present invention relates to a steering bellows.

It relates in particular to a steering bellows comprising a sleeve delimited by a peripheral lateral wall, said sleeve comprising, in succession in the axial direction, at least one first annular end, called large base, capable of forming an end of fixing of the bellows to a first steering element, such as a steering housing or casing to be protected, a part that is deformable in the direction of an elongation or of a shortening of said bellows formed by a succession of coaxial turns, a second annular end, called small base, capable of forming an end of fixing of the bellows to a second steering element, such as a steering tie rod to be protected, said sleeve comprising a transition zone between the deformable part and the large base and having, in the transition zone, a radial output formed in the peripheral lateral wall of the sleeve.

DESCRIPTION OF RELATED ART

In a motor vehicle rack steering system, a steering pinion is linked in rotation with the steering column, maneuvered using the steering wheel of the vehicle, this pinion engaging with a rack that is mounted to slide, in its longitudinal direction, in a steering casing. The two opposite ends of the rack, external to the casing, are coupled to steering tie rods associated respectively with the right and left steering wheels of the vehicle, the tie rods ensuring the link between the rack and each of the stub axles. Thus, the rotation of the steering wheel in one direction or the other, therefore the corresponding rotation of the steering pinion, is converted into a corresponding translation of the rack which, via the tie rods and stub axles, itself provokes the orientation of the wheels of the vehicle, for a right or left turn.

In such a rack steering system, the articulated link between each end of the rack and the corresponding tie rod is a ball joint link, called "axial" ball joint, produced by an axial ball joint housing secured to the end of the rack, and by an axial ball joint pivot with spherical head, secured to the tie rod and mounted to rotate in any direction in the axial ball joint housing.

Given the mobility of the rack relative to the steering casing, and the variable orientation of the tie rod relative to the end of the rack, the protection of the steering in the region of each axial ball joint is usually ensured by a bellows, which links the adjacent end of the steering casing to the corresponding tie rod, by surrounding the end of the rack (external to the casing) and the axial ball joint. An annular end of the bellows is fixed around the end of the steering casing by means of a first attachment collar, tightened around this end. The other annular end of the bellows is fixed around the tie rod, or the axial ball joint pivot, by means of a second attachment collar, tightened around this other end. Fixed thus, the bellows ensures the tightness in the gap between the steering casing and the tie rod.

Between its two ends that are thus attached, the bellows has a certain number of turns, which allow the elongation or the shortening of this bellows depending on the position of the rack relative to the steering casing, and which also allow a flexing of the same bellows, depending on the variable orientation taken by the tie rod by virtue of the ball joint articulation.

A motor vehicle rack steering system is usually produced in a totally sealed manner, in order to avoid any undesirable ingress of water or of moisture into the steering.

The advantage of such an entirely manual steering system is that it is easier in the event of a problem, notably in case of loss of tightness of the bellows, to detect the alteration of the steering resulting from a corrosion. However, with the development of autonomous vehicles and cable steering control, there is no longer necessarily any direct mechanical link between the steering wheel and the rest of the steering system. The result thereof is that it is more difficult to detect damage to the rack linked to a loss of tightness of a bellows. Now, the loss of tightness of a bellows must be detected very rapidly, at the risk otherwise of the rest of the steering system deteriorating very rapidly. Bellows are known that have a radial output that is closed by a closure piece as illustrated in the Korean document KR1020130128622. Bellows are known that house at least one sensor as the patents JP 2012 22 4274 and JP 2012 240435 illustrate. However, the sensors do not give satisfaction notably because of their lack of responsiveness.

OBJECTS AND SUMMARY

One aim of the invention is to propose a steering bellows whose design allows it to be adapted to any type of steering system without compromising the possibility of detecting any failure in terms of tightness of the bellows.

Another aim of the invention is to propose a steering bellows whose design allows a detection of a loss of tightness of the bellows within a very short time.

To this end, the subject of the invention is a steering bellows comprising a sleeve delimited by a peripheral lateral wall, said sleeve comprising, in succession in the axial direction, at least one first annular end, called large base, a part that is deformable in the direction of an elongation or of a shortening of said bellows formed by a succession of coaxial turns, a second annular end, called small base, said sleeve comprising a transition zone between the deformable part and the large base and having, in the transition zone, a radial output formed in the peripheral lateral wall of the sleeve, characterized in that the radial output is closed by a tubular end connector added onto said radial output and having a first end connected to the radial output and a closed opposite end, this end connector extending outside of the sleeve, this end connector internally delimiting a cavity housing at least one sensor of fluid-tightness of said bellows. The incorporation of at least one fluid-tightness sensor, that is to say a sensor for determining a parameter representative of the tightness to fluids, namely to liquids and gases, of the bellows, in a tubular end connector external to the sleeve, allows easy mounting and maintenance of this sensor. An end connector external to the sleeve is understood to be an end connector which does not protrude into the sleeve. The first end of the end connector does not extend protruding from the outlet of the radial output in the sleeve to protrude into the sleeve. Thus, any risk of the end connector forming by its first end, inside the sleeve, an obstacle to the flow of the fluids in the radial output is avoided. The first end of the end connector extends at best flush with the outlet of the radial output in the sleeve. By virtue of this design of the end connector external to the sleeve, the water potentially present in the sleeve because of a loss of seal-tightness can be brought easily to the sensor without having to cross any obstacle. An end connector external to the sleeve is understood to be an end connector which extends protruding from the sleeve. The presence of such a sensor and its design combined with the design of the end connector and of the radial output allow, whatever the type of steering system, the rapid and easy detection of a loss of seal-tightness of the bellows. This loss of seal-tightness of the bellows or leak of the bellows can be the result of a hole or simply of a porosity resulting from the wear of the bellows.

According to one embodiment of the invention, the end connector is provided with a peripheral flange positioned pressed onto the perimeter of the radial output when the end connector is in the state coupled to the sleeve. The result thereof is a simplicity of fixing of the end connector and an ease of production of a sealed mounting between the end connector and the sleeve.

According to one embodiment of the invention, the sensor of fluid-tightness of said bellows is an electrical sensor equipped with at least one electrical wire and the or at least one of the electrical wires protrudes from the end connector through the closed end of the end connector. This design allows an easy subsequent connection of the sensor to a control unit.

As a variant, the sensor of fluid-tightness comprises an energy accumulator, said tightness sensor being in communication wirelessly with a remote terminal.

According to one embodiment of the invention, the end connector comprises a tubular body that is open at each of its ends and a cover for closure of one end of the body to form the closed end of the end connector.

According to one embodiment of the invention, the cover is at least snap-fitted or screwed or glued or welded onto the body and the or at least one of the sensors is secured to the cover. This disposition allows an easy mounting of the sensor.

According to one embodiment of the invention, the end connector is a one-piece monolithic part. This embodiment once again allows an easy mounting of the sensor.

According to one embodiment of the invention, the or at least one of the sensors of fluid-tightness of said bellows is a gas concentration measurement sensor. This solution has the advantage of not being sensitive to the insalubrious medium of the rack and makes it possible to continuously track any leak of the bellows.

According to one embodiment of the invention, the or at least one of the sensors of fluid-tightness of said bellows is a liquid detection sensor. This design allows simplicity of implementation.

According to one embodiment of the invention, the or at least one of the sensors of fluid-tightness of said bellows is a pressure sensor or a flow rate sensor.

The at least one of the sensors of fluid-tightness of said bellows can therefore be chosen from among the sensors comprising gas concentration measurement sensors, liquid detection sensors, pressure sensors, flow rates sensors.

According to one embodiment of the invention, the end connector is fixed by overmolding to the radial output.

According to one embodiment of the invention, the peripheral lateral wall of the sleeve is provided, on the inner face side turned toward the interior of the sleeve, with an internal circumferential groove emerging in the radial output of the sleeve. The presence of this groove makes it possible to form a guide for the flow of the fluids toward the radial output.

According to one embodiment of the invention, the internal circumferential groove extends over a part of the inner perimeter of the sleeve.

BRIEF DESCRIPTION OF THE DRAWINGS

The invention will be well understood on reading the following description of exemplary embodiments, with reference to the attached drawings in which.

DETAILED DESCRIPTION

Figure 1:
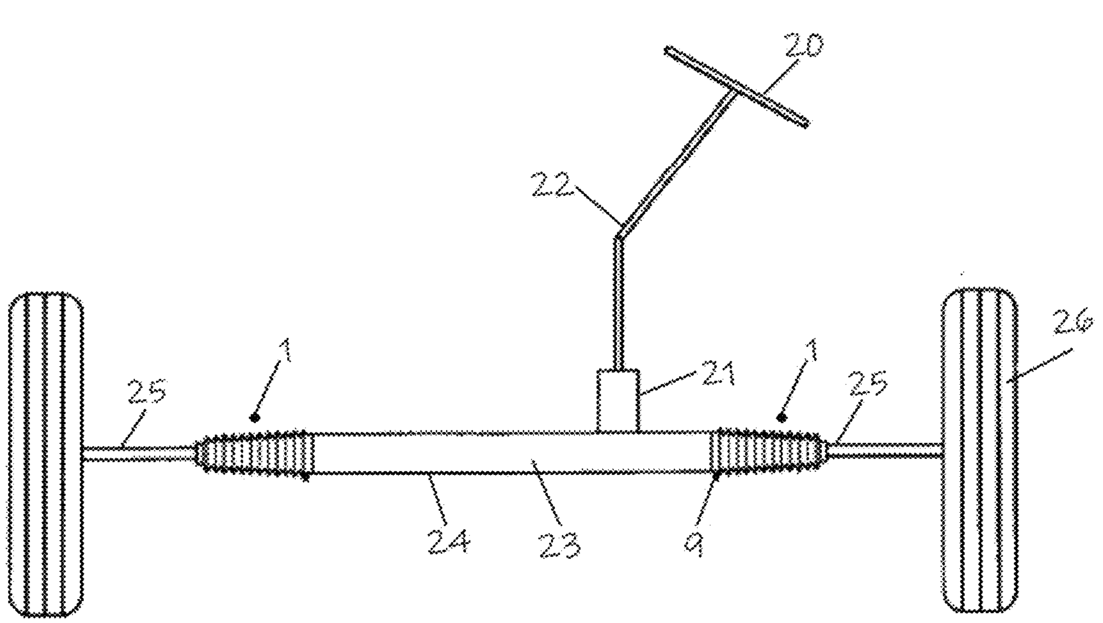
FIG. 1 represents a schematic view of a steering system.

As mentioned hereinabove, the invention relates to a steering bellows 1 that can be incorporated in a steering system of the type of that represented in FIG. 1 which is a rack steering system for a motor vehicle.

In this steering system, the steering column 22 is maneuvered using a steering wheel 20. This steering column 22 is secured in rotation to a pinion 21 which engages with a rack 23 mounted to slide in its longitudinal direction in a steering casing 24.

The two ends of the rack 23 external to the casing 24 are coupled to steering tie rods 25 that are associated respectively with the right and left steering wheels 26 of the vehicle.

Thus, the rotation of the steering wheel in one direction or in the other, therefore the corresponding rotation of the steering pinion, is converted into a corresponding translation of the rack which, via the tie rods and stub axles, itself provokes the orientation of the wheels of the vehicle for a right or left turn.

In such a rack steering system, the articulated link between each end of the rack 23 and the corresponding tie rod 25 is a ball joint link called axial ball joint, produced by an axial ball joint housing secured to the end of the rack 23 and by an axial ball joint pivot with spherical head secured to the tie rod 25 and mounted to rotate in any direction in the axial ball joint housing.

The steering bellows 1 comprises a sleeve 2 delimited by a peripheral lateral wall 3. The sleeve 2 is preferably of tapered cylindrical form. This sleeve 2, which is produced in synthetic material, generally by injection-molding or blow-molding, comprises in succession, in the axial direction, at least one first annular end called large base 4 capable of forming an end of fixing the bellows 1 to a first steering element, such as the steering housing or casing 24 to be protected, a part 5 that is deformable in the direction of an elongation or of a shortening of the bellows 1 formed by a succession of coaxial turns, a second annular end called small base 6 capable of forming an end of fixing the bellows 1 to a second steering element, such as a steering tie rod 25 to be protected. The sleeve 2 also comprises a transition zone 7 between the deformable part 5 and the large base 4.

Given the mobility of the rack 23 relative to the steering casing 24 and the variable orientation of the tie rod 25 relative to the end of the rack 23, the protection of the steering system in the region of each axial ball joint is therefore ensured by the bellows 1 which links the adjacent end of the steering casing 24 to the corresponding tie rod 25 by surrounding the end of the rack (external to the casing) and the axial ball joint.

The large base 4 of the bellows 1 is fixed around the end of the steering casing 24 by means of a first attachment collar tightened around this end. The small base 6 of the bellows 1 is fixed around the tie rod 25 or the axial ball joint pivot by means of a second attachment collar tightened around this small base 6.

The deformable part 5 of the steering bellows 1 allows the elongation or the shortening of this bellows depending on the position of the rack 23 relative to the steering casing 24.

The sleeve 2 has, in the transition zone 7, a radial output 8 formed in the peripheral lateral wall 3 of the sleeve 2. This radial output 8 is closed by a tubular end connector 9 added on to said radial output 8.

This tubular end connector 9 has a first end 10 connected to the radial output 8 and a closed opposite end 11. The closed end of the tubular end connector 9 preferably constitutes the low point of the bellows when the bellows is in the state mounted in a steering system. This end connector 9 extends outside of the sleeve 2, without protruding into the sleeve. This end connector 9 does not extend into the sleeve beyond the outlet of the radial output 8 inside the sleeve. It is thus impossible for this end connector 9 to form an obstacle to the flow of fluid inside the radial output 8. This end connector 9 can be straight as in the example represented or bent or have any other type of form without departing from the invention. This end connector 9 internally delimits a cavity 12 housing at least one sensor 13 for determining a parameter representative of the fluid-tightness of said bellows 1.

This or these tightness sensors 13 make it possible to detect a leak of the bellows. Indeed, a motor vehicle rack steering system is usually produced in a totally sealed manner in order to avoid any undesirable ingress of water or of moisture inside the steering system.

As mentioned above, the end connector 9 can take on a large number of forms.

Independently of its embodiment, the end connector 9 is provided with a peripheral flange 14 positioned pressed onto the perimeter of the radial output 8 of the sleeve when the end connector 9 is in the state coupled to the sleeve 2.

The press is maintained by overmolding, at the time of manufacturing of the sleeve 2, when the end connector 9 is an insert positioned in the bellows manufacturing mold. Obviously, other embodiments of the coupling of the end connector 9 to the sleeve 2 can be produced. Thus, a snap-fitting, a gluing, or a welding or the like can be envisaged.

Figure 3:
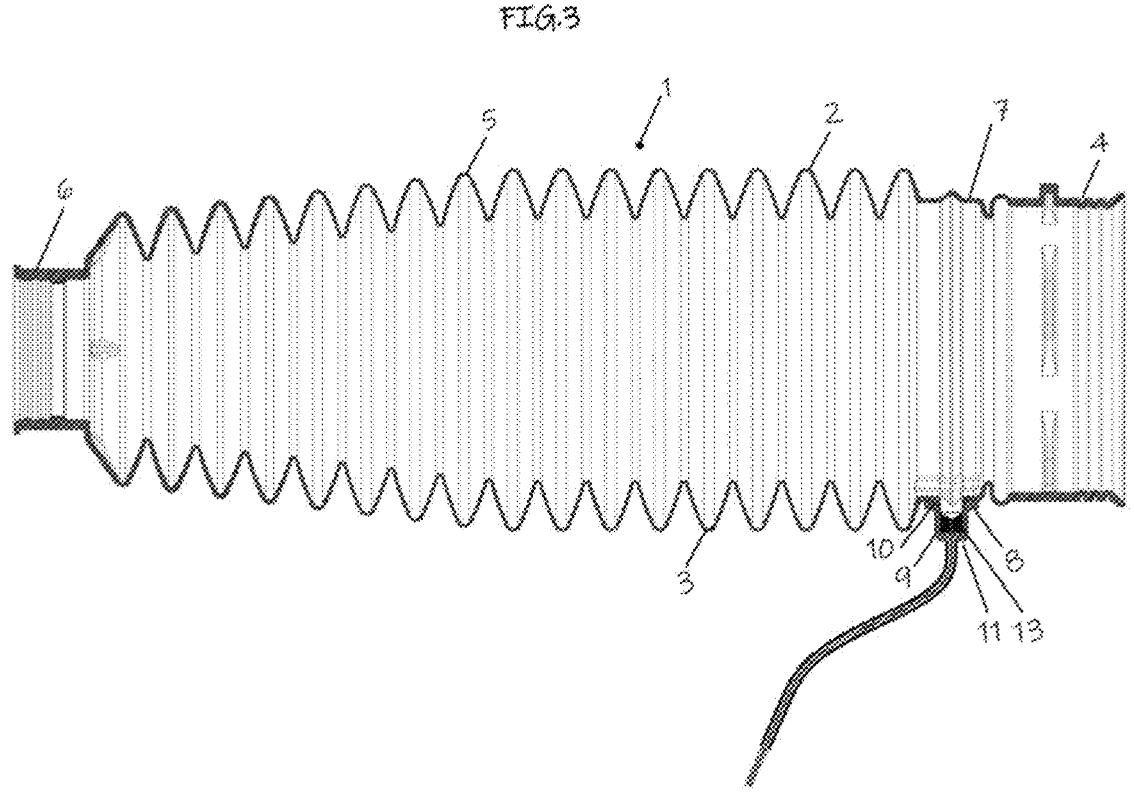
FIG. 3 represents a schematic view of a bellows according to the invention.
Figure 4:
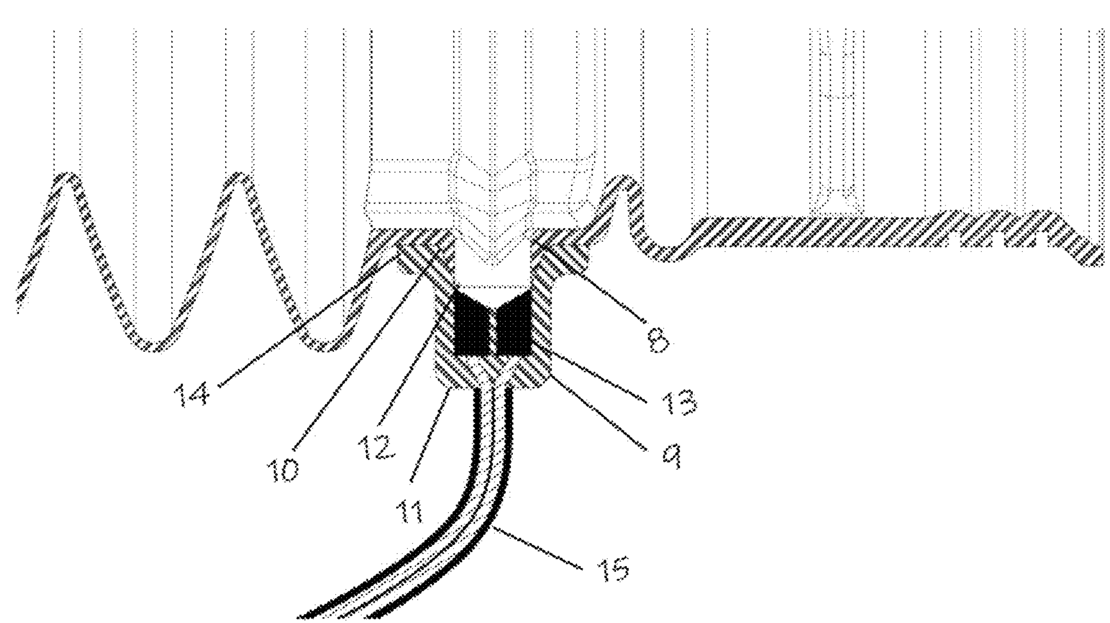
FIG. 4 represents a detail view of the end connector of FIG. 3.

In the example represented in FIGS. 3 and 4, the end connector 9 is a one-piece monolithic part. The sensor 13 of tightness to fluids, that is to say to gases and to liquids, of the bellows 1 is therefore prepositioned in the cavity 10 of the end connector 9 and the end connector 9 is then fixed to the sleeve 2.

Figure 5:
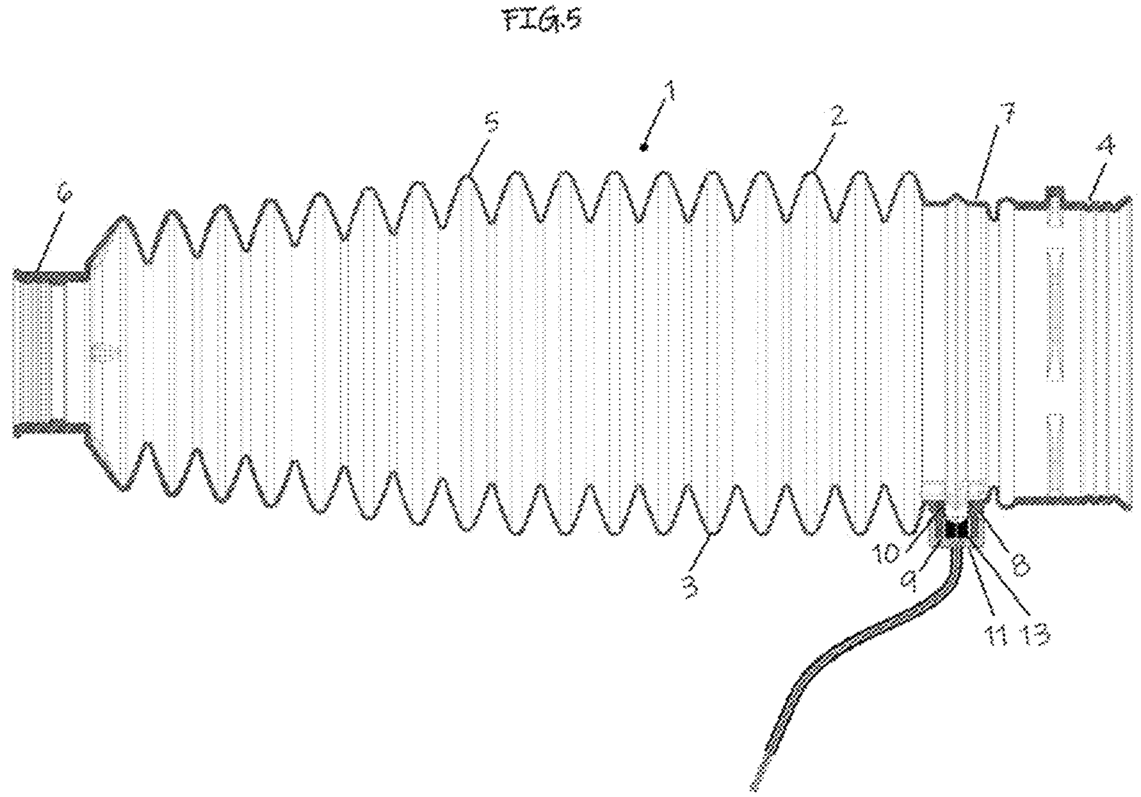
FIG. 5 represents a schematic view of a bellows according to the invention.
Figure 6:
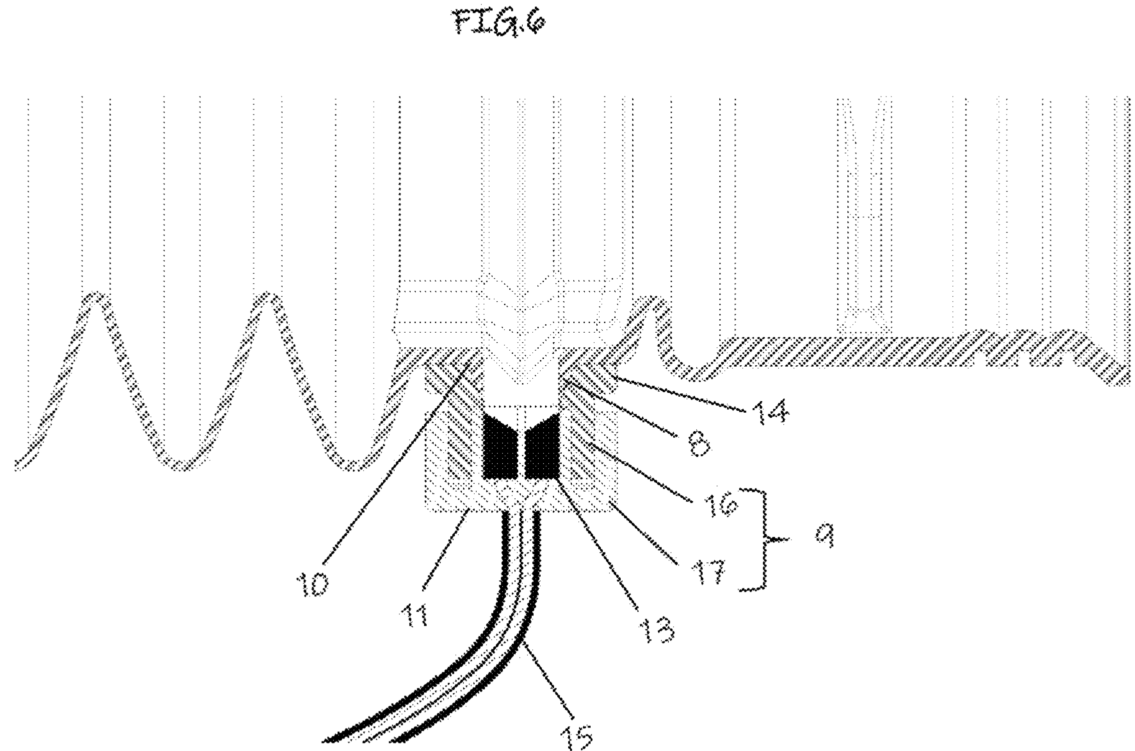
FIG. 6 represents a detail view of the end connector of FIG. 5.
Figure 7:
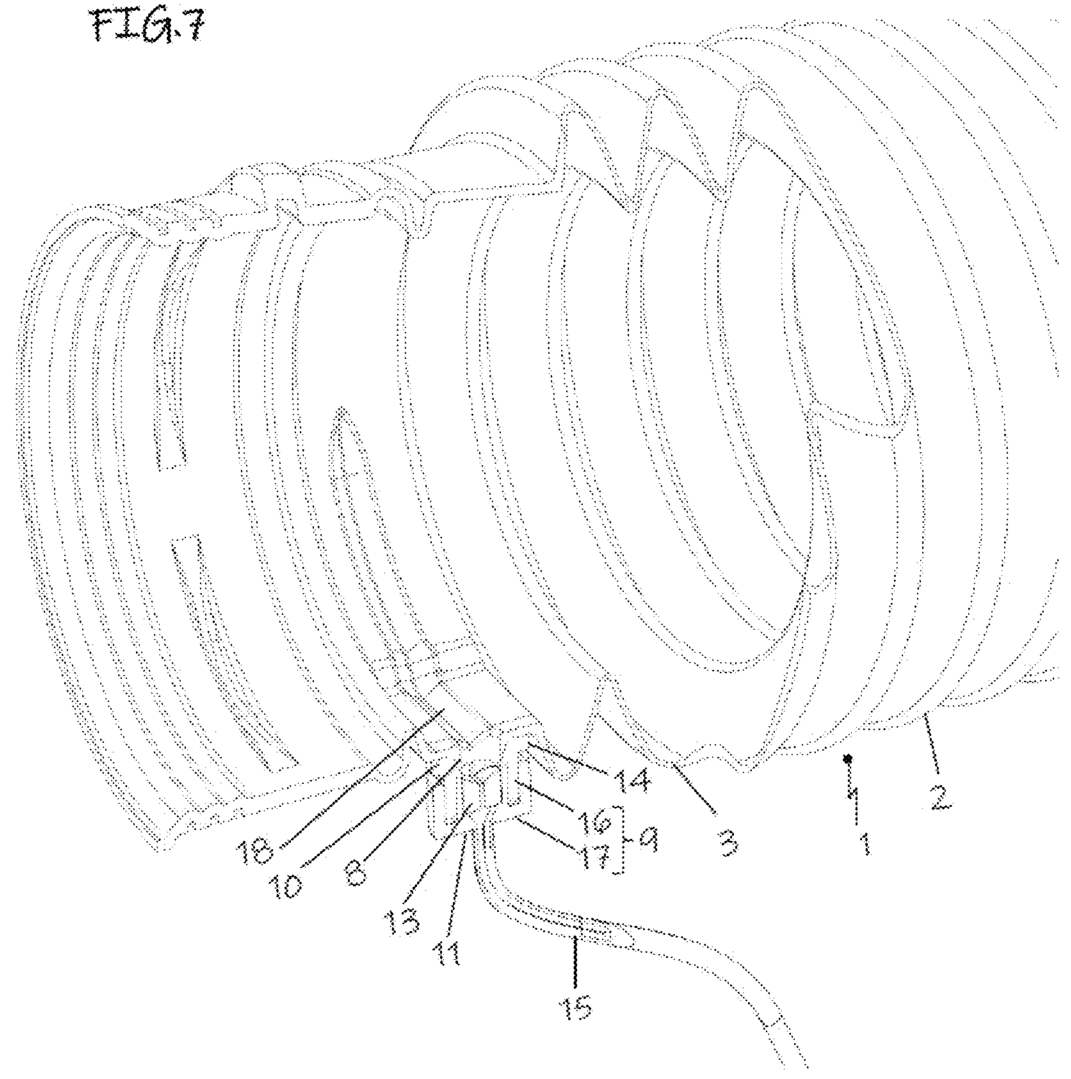
FIG. 7 represents a partial view of a bellows whose sleeve is equipped with an internal peripheral groove.
Figure 8:
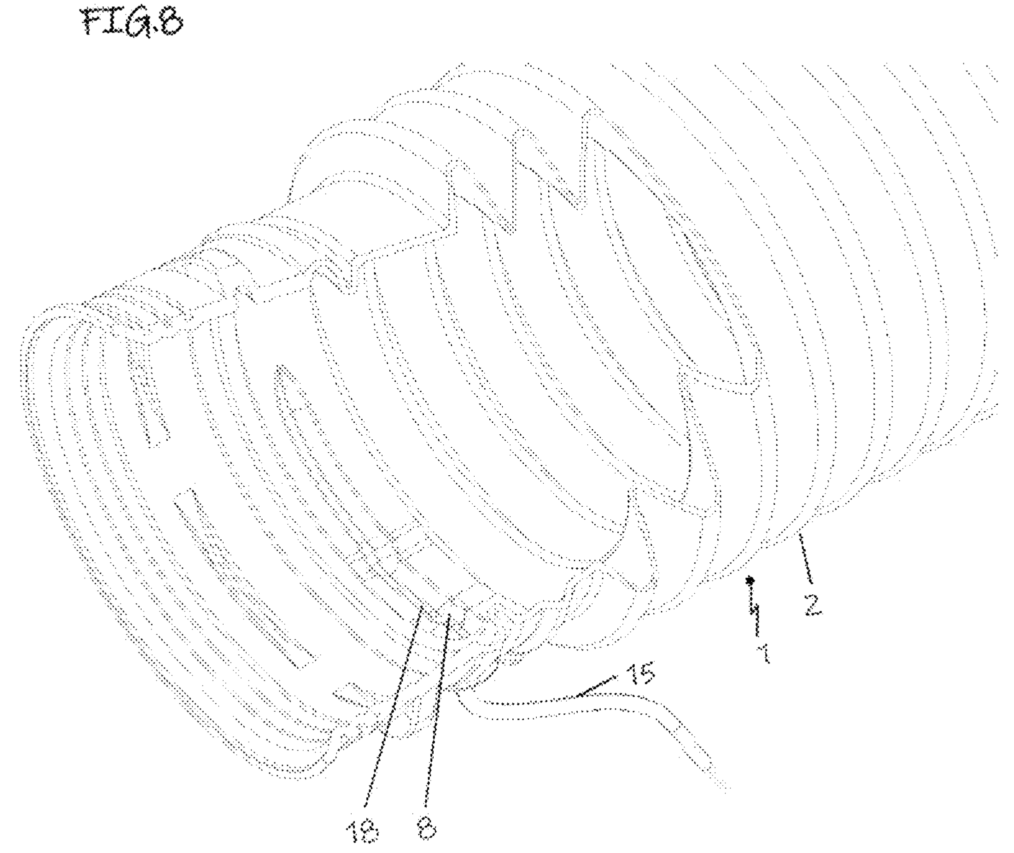
FIG. 8 represents a partial view of a bellows whose sleeve is equipped with an internal peripheral groove.

In the example represented in FIGS. 5 and 6, the end connector 9 comprises a tubular body 16 that is open at each of its ends and a cover 17 for closure of one end of the body 16 to form the closed end 11 of the end connector 9.

This cover 17 can be snap-fitted or screwed or glued or welded onto the body 16.

The or at least one of the sensors 13 is preferably secured to the cover 17. In the case of a snap-fitting, it is particularly easy to change the sensor 13 in the event of failure.

In this embodiment, the body 16 of the end connector 9 and the sleeve 2 can be preassembled by welding during the manufacturing of the sleeve, then the fluid-tightness sensor 13 secured to the cover 17 is installed by simple fixing of the cover 17 to the body 16.

In the examples represented, the sensor 13 of fluid-tightness of said bellows is an electrical sensor equipped with at least one electrical wire 15 and the or at least one of the electrical wires 15 protrudes from the end connector 9 through the closed end 11 of the end connector 9.

This or these wires make it possible to connect the sensor or sensors to a control unit that is not represented.

Said control unit takes the form of an electronic and computing system which comprises for example a microprocessor and a working memory. According to a particular aspect, the control unit can take the form of a programmable logic controller.

In other words, the functions and steps described can be implemented in computer program form or via hardware components (for example programmable gate arrays). In particular, the functions and steps applied by the drive unit or its modules can be produced by instruction sets or computing modules implemented in a processor or controller or be produced by dedicated electronic components or components of programmable logic circuit type (or FPGA which is the acronym for field-programmable gate array) or of application-specific integrated circuit (or ASIC) type. It is also possible to combine computing parts and electronic parts.

When it is specified that the unit or means or modules of said unit are configured to perform a given operation, that means that the unit comprises computing instructions and corresponding execution means which make it possible to perform said operation and/or that the unit comprises corresponding electronic components.

The sensor or sensors 13 of tightness to fluids, that is to say to liquids and gases, of the bellows can also take on a large number of forms.

Figure 2:
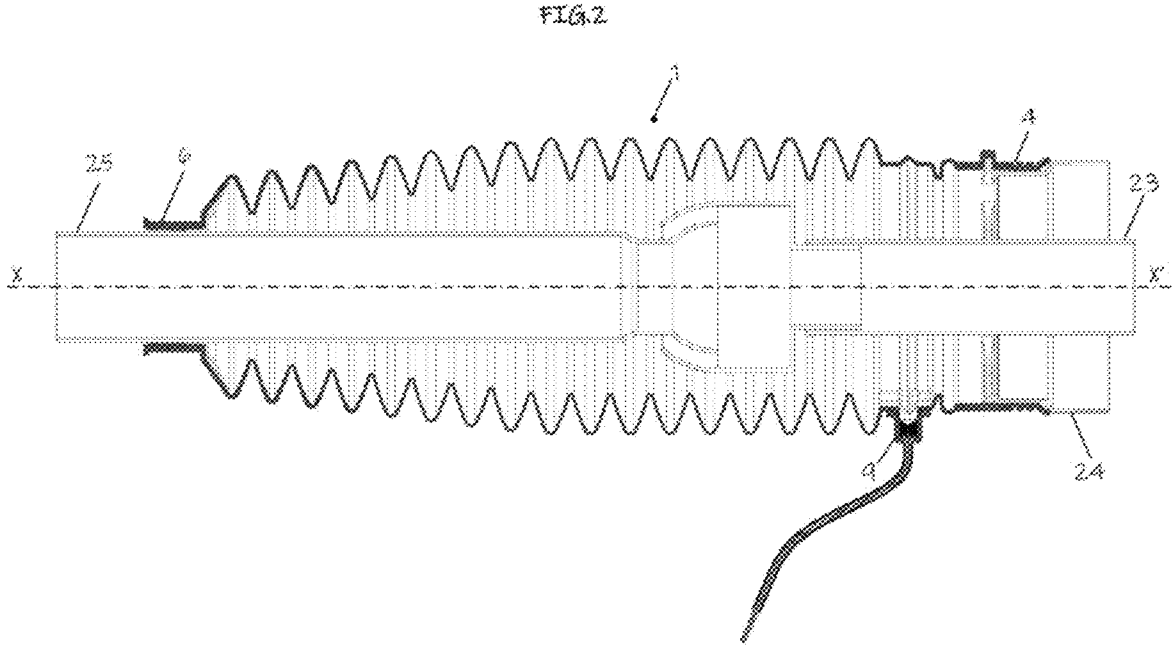
FIG. 2 represents a schematic view in cross section of a bellows when in the state coupled to elements of a steering system.

Thus, the or at least one of the sensors 13 of fluid-tightness of the bellows 1 can be a sensor for detecting liquid, in particular water. In this case, the end connector 9 forms the low point of the bellows, when the bellows is in the state positioned on the steering system. The bellows extends with the longitudinal axis of the sleeve represented as XX' in FIG. 2 disposed horizontally. The low point of the bellows is formed by the end connector 9 with the sensor 13, such that when the bellows is no longer sealed, water can enter into the bellows and come by gravity to be positioned in the end connector. This water can also be the result of a condensation of the moisture inside the bellows.

The presence of this water is detected by the sensor 13. This information is transmitted to the control unit, which can then emit a control signal for an alert device such as a device for emitting a sound or light signal.

As a variant or in addition, the or at least one of the sensors 13 of fluid-tightness of the bellows 1 can be a gas concentration measurement sensor. In this embodiment, a gas can be introduced into the bellows when the bellows is mounted on the rest of the steering system.

The presence of this gas can be measured in real time continuously by the sensor 13. In the event of a leak of the bellows, a drop in the concentration of gas is observed, by comparison with a predetermined value. In the event of a problem, once again the control unit to which the signals from the sensor 13 are addressed can emit a control signal for an alert device.

The gas concentration sensor 13 can be a sensor for measuring carbon monoxide (CO) in the air. This sensor for measuring CO in the air can be an infrared sensor, or incorporate a chemical reagent in a way that is known per se.

Obviously, the concentration of other gases, such as oxygen or nitrogen, can also be measured without departing from the framework of the invention.

As a variant or in addition, the or at least one of the sensors 13 of fluid-tightness of the bellows 1 can be a pressure sensor. The bellows is connected to a pressure source. A leak measurement by loss of pressure is measured. This solution is not preferred, because it necessitates a consequential experimental phase.

As a variant or in addition, the or at least one of the tightness sensors 13 can be a flow rate sensor. In this embodiment, an air flow rate is injected into the bellows and the loss of flow rate is measured at the radial output. Once again, this solution is not preferred, because it necessitates a consequential experimental phase.

To perfect the bellows, the peripheral lateral wall 3 of the sleeve 2 can be provided, on the inner face side turned toward the interior of the sleeve 2, with an internal circumferential groove 18 emerging in the radial output (8) of the sleeve 2. This groove 18 makes it possible to guide the fluids whose presence results from a loss of tightness to the radial output 8 to bring them into contact with the sensor. Once again, this disposition makes it possible to increase the speed of responsiveness of the sensor. In the example represented, the internal circumferential groove 18 extends over a part of the inner perimeter of the sleeve 2. Obviously, this internal peripheral groove 18 could have been able to extend over the entire internal circumference of the sleeve without departing from the framework of the invention.

The invention claimed is:

1. A steering bellows comprising:

a sleeve delimited by a peripheral lateral wall, said sleeve comprising, in succession in the axial direction, at least one first annular end, called large base, a part that is deformable in the direction of an elongation or of a shortening of said bellows formed by a succession of coaxial turns and a second annular end, called small base, said sleeve comprising a transition zone between the deformable part and the large base, and having, in the transition zone, a radial output formed in the peripheral lateral wall of the sleeve, wherein the radial output is closed by a tubular end connector added onto said radial output and having a first end connected to the radial output and a closed opposite end, this end connector extending outside of the sleeve, this end connector internally delimiting a cavity housing at least one sensor of fluid-tightness of said bellows.

2. The steering bellows as claimed in claim 1, wherein the end connector is provided with a peripheral flange positioned pressed onto a perimeter of the radial output when the end connector is in the state coupled to the sleeve.

3. The steering bellows as claimed in claim 1, wherein the sensor of fluid-tightness of said bellows is an electrical sensor equipped with at least one electrical wire and in that the or at least one of the electrical wires protrudes from the end connector through the closed end of the end connector.

4. The steering bellows as claimed in claim 1, wherein the end connector comprises a tubular body that is open at each of its ends and a cover for closure of one end of the body to form the closed end of the end connector.

5. The steering bellows as claimed in claim 4, wherein the cover is at least snap-fitted or screwed or glued or welded onto the body and in that the or at least one of the sensors is secured to the cover.

6. The steering bellows as claimed in claim 1, wherein the end connector is a one-piece monolithic part.

7. The steering bellows as claimed in claim 1, wherein the or at least one of the sensors of fluid-tightness of said bellows is a gas concentration measurement sensor.

8. The steering bellows as claimed in claim 1, wherein the or at least one of the sensors of fluid-tightness of said bellows is a liquid detection sensor.

9. The steering bellows as claimed in claim 1, wherein the or at least one of the sensors of fluid-tightness of said bellows is a pressure sensor or a flow rate sensor.

10. The steering bellows as claimed in claim 1, wherein the end connector is fixed by overmolding to the radial output.

11. The steering bellows as claimed in claim 1, wherein the peripheral lateral wall of the sleeve is provided, on the inner face side turned toward the interior of the sleeve, with an internal circumferential groove emerging in the radial output of the sleeve.

12. The steering bellows as claimed in claim 11, wherein the internal circumferential groove extends over a part of an inner perimeter of the sleeve.

* * * * *